United States Patent [19]

Arai et al.

[11] Patent Number: 4,813,702
[45] Date of Patent: Mar. 21, 1989

[54] SUSPENSION STRUCTURE FOR AN AUTOMOTIVE VEHICLE

[75] Inventors: Hideo Arai, Fujisawa; Kenzi Ookawara, Kawasaki, both of Japan

[73] Assignee: Nissan Motor Company, Limited, Kanagawa, Japan

[21] Appl. No.: 386,032

[22] Filed: Jun. 7, 1982

[30] Foreign Application Priority Data

Jun. 10, 1981 [JP] Japan ................. 56-89384

[51] Int. Cl.$^4$ .............................. B60G 1/00
[52] U.S. Cl. ................... 280/688; 280/725
[58] Field of Search ............ 280/685, 688, 724, 725, 280/715, 721, 723; 267/20 R, 153

[56] References Cited

U.S. PATENT DOCUMENTS

| 2,929,639 | 3/1960 | Barenyi et al. | 280/724 |
| 2,989,330 | 6/1961 | Wroby | 287/85 |
| 3,486,762 | 12/1969 | Turnbull | 280/721 |
| 3,556,555 | 1/1971 | Abbott et al. | 280/721 |
| 4,121,813 | 10/1978 | Inuzuka | 267/57.1 A |
| 4,157,840 | 6/1979 | Kroniger et al. | 280/688 |
| 4,213,632 | 7/1980 | Stotz et al. | 280/721 |
| 4,334,696 | 6/1982 | Bergstrom | 280/688 |

FOREIGN PATENT DOCUMENTS

| 142610 | 7/1951 | Australia . | |
| 205200 | 1/1957 | Australia . | |
| 220702 | 3/1959 | Australia . | |
| 1555163 | 11/1970 | Fed. Rep. of Germany | 280/688 |
| 53-420 | 4/1979 | Japan | 280/725 |
| 57-205207 | 12/1982 | Japan . | |

Primary Examiner—Charles A. Marmor
Assistant Examiner—Ross Weaver
Attorney, Agent, or Firm—Foley & Lardner, Schwartz, Jeffery, Schwaab, Mack, Blumenthal & Evans

[57] ABSTRACT

The pitching motion of the vehicle can be suppressed by a pitch suppressing member interpositioned between a suspension upper and lower members. The pitch suppressing member is fixed to the suspension upper member and connected to the suspension lower member via upper and lower links. The pitch suppressing member and the upper and lower links are so connected that the pitching force will act on respective upper and lower links in opposite direction to provide opposite directions of rotational torques. Bushings interpositioned between the pitch suppressing member and upper and lower links are provided with enough rigidity or suppressing the pitching motion of the vehicle. On the other hand, bushings between the pitch suppressing member and the vehicle floor member are provided with enough flexibility for satisfactorily absorbing bounding and rebounding force due to road shock.

31 Claims, 4 Drawing Sheets

SUSPENSION STRUCTURE FOR AN AUTOMOTIVE VEHICLE

BACKGROUND OF THE INVENTION

The present invention relates generally to a suspension structure for an automotive vehicle. More particularly, the invention relates to a structure of a link-type vehicle rear suspension such as a parallel link suspension.

As is well known, satisfactory vehicle suspension is based upon two contradictory requirements. One is driving stability which can be obtained by increasing damping force against relative movement of the vehicle body, wheel and wheel axle to keep the positional relationship of the vehicle body and wheel constant. Although driving stability will be increased by increasing of damping forces, riding comfort may be degraded due to increasing rigidity of the suspension assembly. Namely, by increasing rigidity, the suspension assembly is apt to transmit road shock directly to the vehicle to cause rough riding. On the other hand, riding comfort can be increased by reducing damping force of a suspension assembly to permit relatively large displacement of the vehicle body and wheel with respect to each other. This, in turn, may increase rolling, pitching and yawing of a vehicle to degrade driving stability. Therefore, it is impossible to satisfy both requirements completely.

SUMMARY OF THE INVENTION

It is therefore an object of the present invention to provide a vehicle suspension which is capable of providing riding comfort and satisfactory driving stability.

Another and more specific object of the present invention is to provide a pitching-suppressive suspension structure which suppresses rising-up and nose dive of the vehicle upon abrupt acceleration and deceleration of the vehicle without causing degrading of the riding comfort.

The pitching motion of the vehicle can be suppressed by a pitch suppressing member interpositioned between a suspension upper and lower members. The pitch suppressing member is mounted onto the suspension upper member and connected to the suspension lower member via upper and lower links. The pitch suppressing member and the upper and lower links are so connected that pitching force will act on respective upper and lower links in opposite directions to provide opposite direction of rotational torques to the pitch supporessing member. By these rotational torques, the upper and lower links interfere respective movements.

Preferably, bushings interpositioned between the pitch suppressing member and upper and lower links are provided with enough hardness or rigidity for satisfactorily suppressing pitch motion of the vehicle. On the other hand, bushings between the pitch suppressing member and the vehicle floor member as the suspension upper member are provided enough flexibility for satisfactorily absorbing bounding and rebounding force of the road shock.

According to one embodiment of the present invention, there is provided a suspension structure for an automotive vehicle, which comprises an upper link connected to the wheel axle at one end thereof, a lower link connected to the wheel axle at one end thereof, a pitch suppressing member having a first portion connected to a vehicle floor member at a vertically movable position, the pitch suppressing member being connected to the upper and lower links at second and third portions, one of the second and third portions being vertically offset from the level of the first portion, and means for restricting the vertical movement of the pitch suppressing member with a predetermined range.

BRIEF DESCRIPTION OF THE DRAWINGS

The present invention will be understood more fully from the detailed description given hereinbelow and from the accompanying drawings of the preferred embodiments of the invention, which, however, should not be taken as limitative to the invention but for elucidation and explanation only.

In the drawings.

DESCRIPTION OF THE PREFERRED EMBODIMENT

Figure 1:
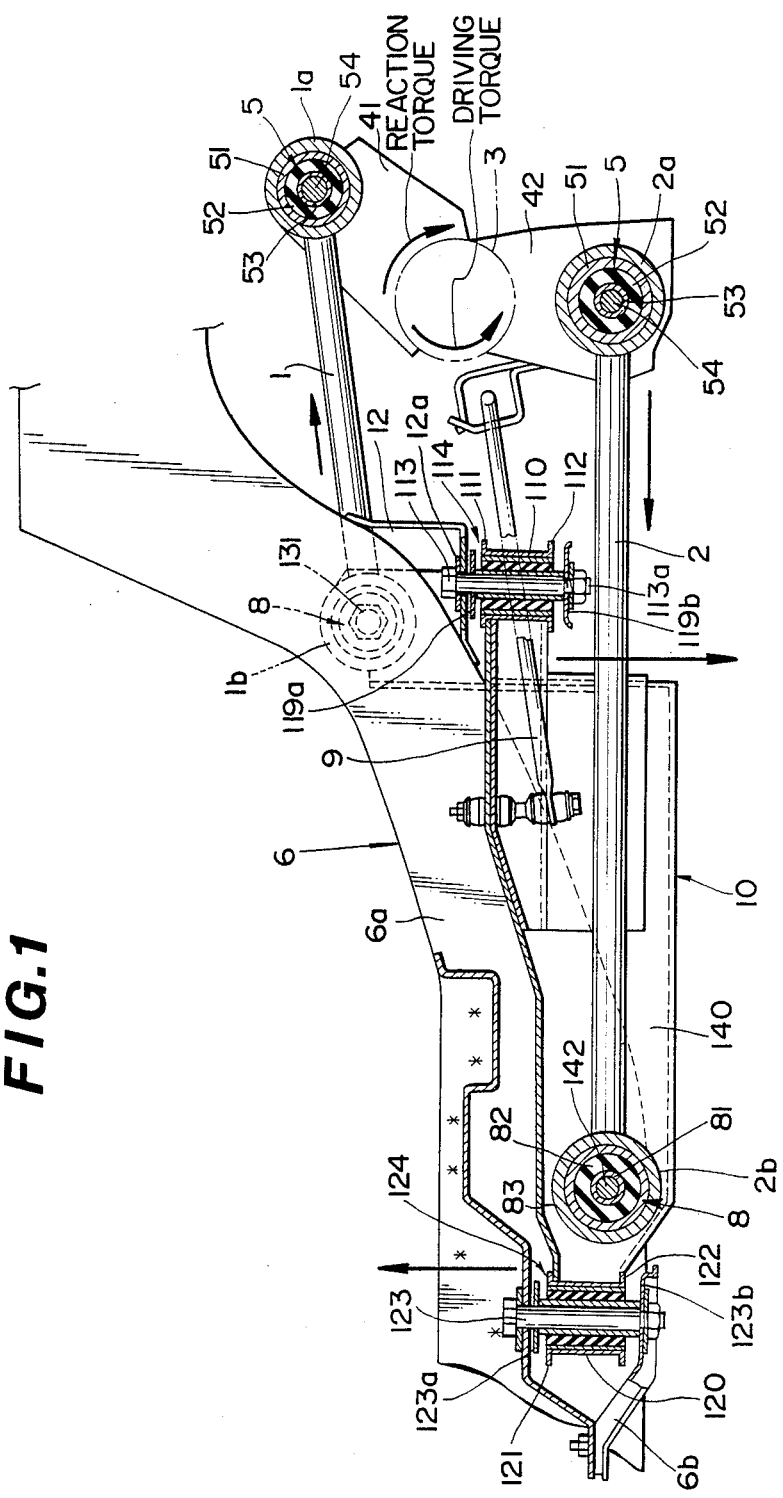
FIG. 1 is a side elevation of the preferred embodiment of a vehicle rear suspension according to the present invention.
Figure 2:
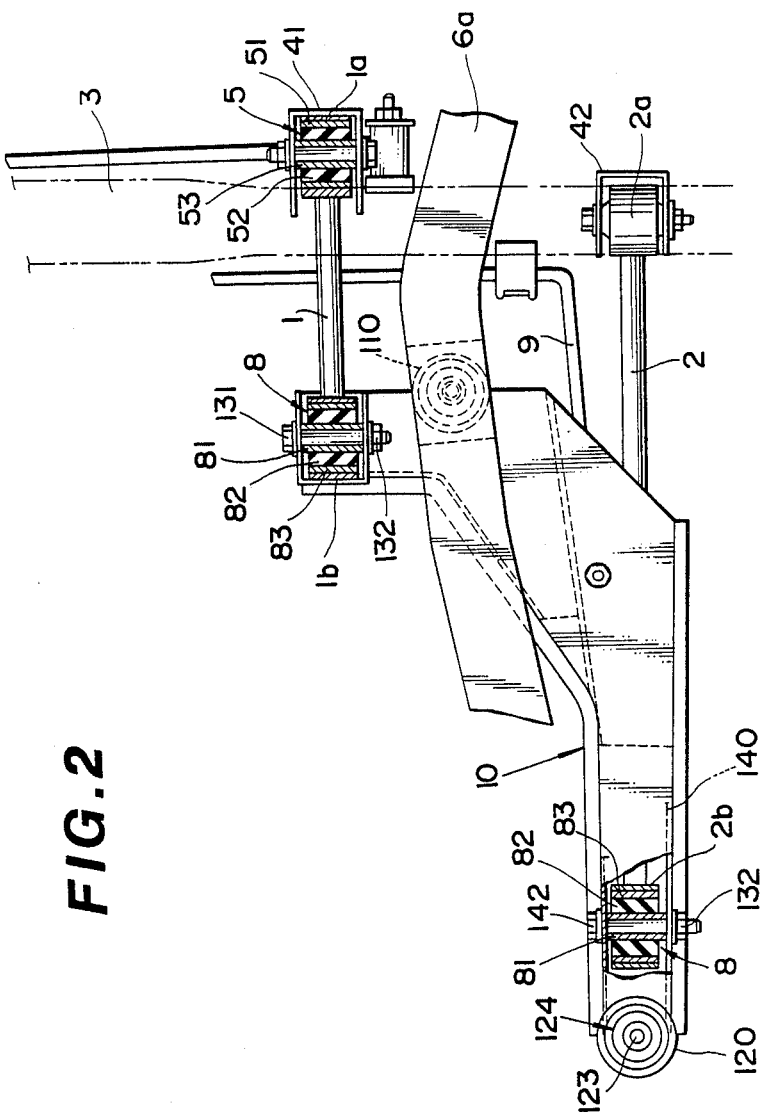
FIG. 2 is a plan view of the vehicle rear suspension of FIG. 1.
Figure 3:
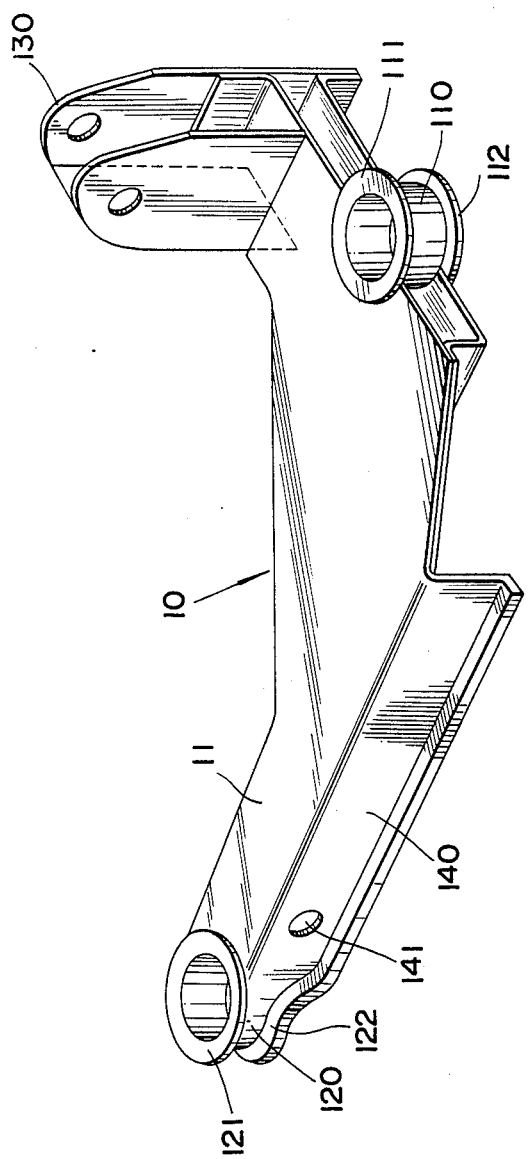
FIG. 3 is a perspective view of a pitch suppressing member used in the vehicle suspension of FIG. 1.

Referring now to the drawings, particularly to FIGS. 1 to 3, there is illustrated a preferred embodiment of a parallel-link type rear suspension structure according to the present invention. In the parallel-link type rear suspension, a transaxle housing 3 is suspended below a vehicle floor member 6 via an upper link 1 and a lower link 2, and a shock absorber assembly (not shown) including a shock absorber and a suspension spring interpositioned between the vehicle floor member 6 and the transaxle housing 3. A pitch suppressing member 10 is provided between the vehicle floor member 6 and the upper and lower links 1 and 2.

In the embodiment shown, a stabilizer 9 is also provided in order to reinforce rolling stability of the vehicle suspension. However, the stabilizer is not always required for the vehicle suspension and can be neglected.

As shown in FIG. 3, the pitch suppressing member 10 is formed into a generally L-shaped configuration. A bracket 130 is upwardly extended from a rear end of the member 10. Adjacent the bracket 130, the member 10 is provided with a cylindrical portion 110 with upper and lower flanges 111 and 112. Likewise, a cylindrical portion 120 is provided at the other end front end) of the member 10, with upper and lower flanges 121 and 122. The member 10 is further formed with a vertically bent sections 140 extending adjacent the cylindrical portion 120 and along the both edges of a portion 11 of the member. The bent sections 140 is formed with a through openings 141 respectively.

The member 10 is attached to a vehicle floor side member 6a with fixing bolts 113 and a mounting shaft 123 respectively passing through the cylindrical portions 110 and 120. Bushing assemblies 114 and 124 are respectively inserted in the cylindrical portions 110 and 120 and surround the fixing bolts 113 and the mounting shaft 123.

Figure 4:
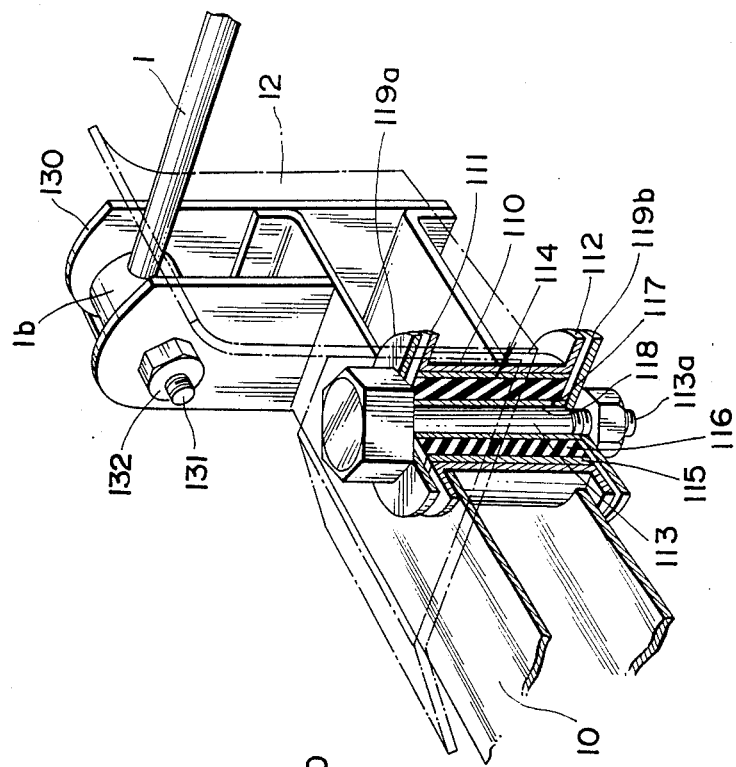
FIG. 4 is a partly sectioned perspective view showing a connection between the pitch suppressing member and an upper link.
Figure 5:
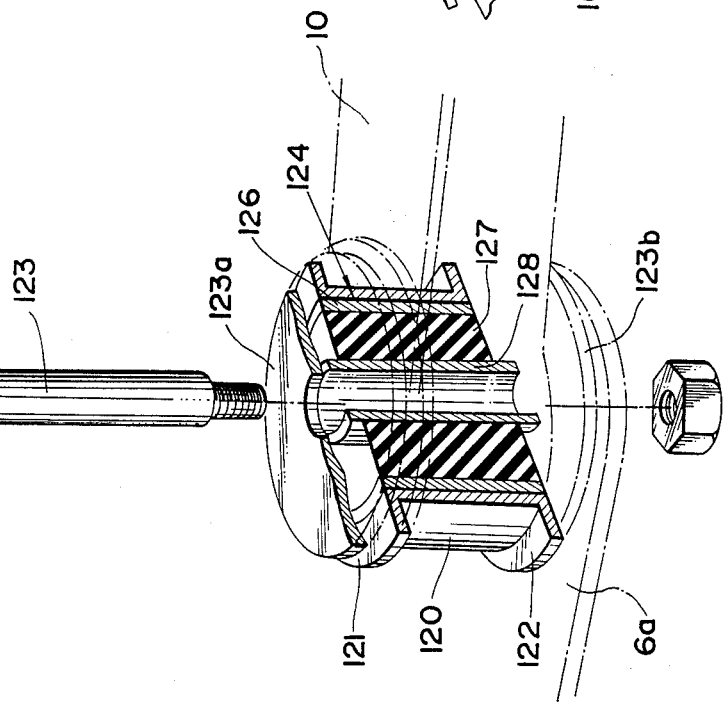
FIG. 5 is a partly sectioned perspective view showing a connection between the pitch suppressing member and a lower link.

As shown in FIG. 4, the cylindrical portion 110 of the member 10 receives the bushing assembly 114 which comprises an outer cylinder 115, a cylindrical rubber bushing 116 and an inner cylinder 117. The outer cylinder 114 is fitted onto the inner periphery of the cylindrical portion 110 so that the bushing assembly 114 is mounted within the cylindrical portion. The inner cylinder 117 defines a through opening 118 to pass the fastening bolt 113. The inner cylinder 117 extends axially from the upper and lower ends of the bushing assembly 114 to contact the upper and lower ends thereof to collars 119a and 119b. The fastening bolt 113 has a stepped narrow diameter threaded section 113a at the end thereof. The fastening bolt 113 passes an opening 12a formed in a bracket 12 fixed to a vehicle floor side member 6a and passes the opening 118 defined by the inner cylinder 117 of the bushing assembly 114. A pair of collars 119a and 11b are provided opposing to upper and lower flanges 111 and 112. The lower collar 119b has a through opening to pass the threaded section 113a of the fastening bolt 113. Therefore, the lower collar 119b is fixed below the flange 112 with a small clearance therebetween. Likewise, the upper collar 119a if fitted to the bracket 12 to provide a small clearance between the flange 111 of the cylindrical portion 110. The cylindrical portion 110 of the member 10 with the bushing assembly 114 is thus fixed onto the vehicle floor side member 6a.

Likewise, the cylindrical potion 120 of the member 10 is inserted in a space defined between the vehicle floor side member 6a and a bracket 6b and mounted therebetween with the mounting shaft 123 with upper and lower collars 123a and 123b. A bushing assembly 124 is inserted in a through opening of the cylindrical portion 110. The bushing assembly 124 comprises an outer cylinder 126, a bushing 127 and an inner cylinder 128. The inner cylinder 128 is axially extended from the upper and lower ends of the bushing assembly 124 to contact the upper and lower ends to th collars 123a and 123b. The outer cylinder 126 is fitted to the inner periphery of the cylindrical portion 120.

The upper link 1 is connected to the transaxle housing 3 with a bracket 41 extending from the transaxle housing 3. A bushing assembly 5 is inserted with a cylindrical end 1a of the upper link 1. The bushing assembly 5 comprises an outer cylinder 51 to be fitted to the inner periphery of the cylinder end 1a, a cylindrical rubber bushing 52 and an inner cylinder 53. A fastening bolt 54 passes through the opening defined by the inner cylinder 53 to connect the cylindrical end 1a to the bracket 41. Likewise, the lower link 2 has a cylindrical end 2a receiving therein a bushing assembly 5. The cylindrical end 2a is connected to a bracket 42 extended from the transaxle housing 3.

At the other ends of the upper and lower links 1 and 2, there are provided cylindrical ends 1b and 2b respectively receiving therein bushing assemblies 8. The cylindrical end 1b of the upper link 1 is connected to the bracket 130 of the mmeber 10 with a mounting bolt 131 and a nut 132 passing through the openings in the bracket and through the inner cylinder 81 of the bushing assembly. The inner cylinder 81 is surrounded a cylindrical rubber bushing 82 and an outer cylinder 83 fitted onto the inner periphery of the cylindrical end 1b. The cylindrical end 2b of the lower link 2 is inserted in a space defined between the vertically bent sections 140.

The cylindrical end 2b is mounted onto the member 10 with a mounting bolt 142 passing through openings 141 formed in the vertically bent sections 140 and the through opening defined by the inner cylinder 81 of the bushing assembly 8.

The rubber bushings 52 and 82 have enough rigidity or hardness to satisfactorily suppress or stabilize pitching motion of the vehicle while the vehicle is subject to rapid acceleration or deceleration. On the other hand, the rubber bushings 116 and 127 are substantially flexible or soft enough to absorb road shock and other vibration force applied to the suspension.

In operation, a road shock applied to the vehicle wheel is transmitted to the vehicle floor panel 6 via the upper and lower links 1 and 2. By the applied road shock, the vehicle floor panel 6 and relative motion is produced between the transaxle housing 3 causing these members to displace from the neutral position toward and away from each other. According to the displacement of the transaxle housing 3 with respect to the vehicle floor panel 6 causes front- and rear-ward movement for the member 10. Namely, assuming the transaxle bounds upwardly, the upper link 1 is rotated counterclockwise in FIG. 1. At the same time, the lower link is also rotated counterclockwise in FIG. 1. The member 10 is thus pulled toward the transaxle housing 3 via the upper and lower links 1 and 2 with deformations of the rubber bushing 116 and 127 of the bushing assemblies 114 and 124. As set forth, since the rubber bushings 116 and 127 interpositioned between the member 10 and the vehicle floor side member 6a is flexible or soft enough to absorb the road shock, the member 10 is displaced in response to bounding up of the transaxle housing 3 with respect to the vehicle floor side member 6a to absorb the shock. Thus, the shock to be transmitted to the vehicle body, i.e., the vehicle floor is satisfactorily absorbed.

At this time, the clearance between the flange portions 111, 112 and 121, and 122 of the cylindrical portions and the collars 119a, 119b and 123a, are maintained for preventing from collision therebetween. Thus, noise possibly created otherwise can be satisfactorily eliminated.

On the other hand, if a pitching torque is applied to the transaxle housing by abrupt starting of the vehicle or abrupt braking, opposite directions of forces act on the upper and lower links 1 and 2. Considering the case of winding up or rising up due to abrupt acceleration or abrupt starting, since the wheel is applied with a substantially big torque to abrupt acceleration, a reacting force is applied to the transaxle housing 3. Thus, the transaxle housing 3 is subject to a clockwise torque. Because of this, a backward force is applied to the upper link 1 and a forward force is applied to the lower link 2. The backward and forward forces are transmitted to the member 10 via the upper and lower links 1 and 2. At this time, the bushing 52 and 82 having enough hardness or rigidity to restrict the motion of upper and lower links 1 and 2, serve to damp the backward and forward forces. Further, the member 10 is limited in its vertical movement with deformation of the rubber bushings 116 and 127 in axial the direction by the collars 119a, 119b, 123a and 123b. In case of winding-up, the bushing assembly 124 contacts the upper collar 123a and the bushing assembly 114 contacts to the lower collar 119b.

As set forth, according to the embodiment shown, the pitching movement of the vehicle is satisfactorily restricted to provide good driving stability.

However the present invention has been illustrated in the specific embodiment, this should not be understood that the invention is restricted to the embodiment shown.

For example, the pitch suppressing member is not restricted to the shown configuration and can be mounted to the vehicle floor in various manners as far as it effects the foregoing function for suppressing the pitching movement of the vehicle and for providing enough riding comfort. Therefore, the number of the bushing assemblies provided between the vehicle floor and the pitch suppressing member is not always two as specified in the embodiment shown. Furthermore, restricting vertical movement of the pitch suppressing member can be achieved by various way to modify the specific embodiment. It is only required, in the gist of the invention, to provide enough restriction for the pitchsuppressing member to rotate with respect to the vehicle body. Further, the bushing assembly interpositioned between the pitch suppressing member and upper and lower links can be replaced with a rigid bushing.

What is claimed is:

1. A suspension structure for an automotive vehicle comprising:
    a wheel axle housing;
    an upper link having two ends, one of said ends being pivotably connected to said wheel axle housing;
    a lower link having two ends, one of said ends being pivotably connected to said wheel axle housing;
    a bracket member connected to a vehicle body through a first bushing assembly having a first elastically deformable bushing and an essentially vertical pivot axis, said bracket being movable in an axial direction of said vertical pivot axis and in a lateral direction with respect to said vertical pivot axis through elastic deformation of said first bushing in said first bushing assembly, said bracket member being connected to the other of said ends of said upper and lower links through second bushing assemblies each of which has a second elastically deformable bushing and an essentially horizontal pivot axis, and allowing pivotal movement of said upper and lower links about said essentially horizontal axes, said first bushing being more flexible than said second bushing; and
    means, associated with said bracket member, for limiting said axial movement of said bracket member relative to said vertical pivot axis within a predetermined range.

2. The structure as set forth in claim 1, wherein said second bushing assemblies are provided between the other of said ends of said upper and lower links and said bracket member.

3. The structure as set forth in claim 2, wherein said limiting means further comprises a pair of collars arranged respectively above and below said pitch suppressing member with clearances defining a vertical motion range of said pitch suppressing member.

4. A suspension structure for an automotive vehicle comprising:
    a wheel axle housing;
    an upper link having two ends, one of said ends being pivotably connected to said shwel axle housing;
    a lower link having two ends, one of said ends being pivotably connected to said wheel axle housing;
    a bracket member connected to a vehicle body through a first bushing assembly and to the other of said ends of said upper and lower links through second bushing assemblies, said bracket member being movable in an axial direction with respect to an essentially vertical pivot axis of said first bushing assembly and movable in a lateral direction relative to said vertical axis, said bracket member allowing pivotal movement of said upper and lower links about essentially horizontal pivot axes of said second bushing assemblies; and
    means, associated with said bracket member, for restricting said vertical movement of said bracket member within a predetermined range which is determined for suppressing pitching movement of the vehicle body.

5. A suspension structure for an automotive vehicle comprising:
    a wheel axle housing;
    an upper link having two ends, one of said ends being pivotably connected to said wheel axle housing;
    a lower link havong two ends, one of said ends being pivotably connected to said wheel axle housing;
    a bracket member connected to a vehicle body through a first bushing assembly having a vertical pivot axis extending essentially in a vertical direction and to the other of said ends of said upper and lower links via second bushing assemblies having horizontal axes extending essentially in a horizontal direction, said bracket member being responsive to bounding and rebounding movement of said wheel axle to move in a lateral direction with respect to said vertical axis and responsive to a torque applied to said wheel axle housing to move in an axial direction of said vertical axis, and said bracket member allowing pivotal movement of said upper and lower links about said horizontal axes; and
    means, associated with said bracket member, for restricting vertical movement of said bracket member within a predetermined range so that a pitching movement of the vehicle body is satisfactorily suppressed.

6. The structure as set forth in claim 2, 4 or 5 wherein said first bushing assembly includes a substantially flexible bushing and said second bushing assemblies include a substantially rigid bushing.

7. The structure as set forth inclaim 1, 2, 4 or 5, wherein said other of said ends of said upper and lower links are connected to said bracket member at different elevational levels with respect to each other.

8. The structure as set forth in claim 7, wherein said other of said ends of said upper and lower links are connected to said bracket member at laterally different positions relative to each other.

9. The structure as set forth in claim 2, 4 or 5, wherein said first bushing assembly is more flexible than said second bushing assembly.

10. A parallel link type automotive suspension comprising:
    upper and lower links, each of said upper and lower links having a forward end and a rear end, said rear ends of said links being associated, respectively, with lateral ends of a wheel axle housing;
    a bracket having front and rear portions respectively, connected to a vehicle body via essentially vertical first shafts and connected to said forward ends of said upper and lower links via essentially horizontal second and third shafts, said bracket being adapted to allow pivotal movement of said upper and lower links about said second and third shafts and being movable in horizontal and vertical directions about said first shafts; and means, incorporated with said bracket, for restricting vertical movement of said bracket about said first shafts to a given range for suppressing vertical displacement of the vehicle body relative to said wheel axle housing.

11. A pitch suppressive parallel link type suspension for an automotive vehicle comprising:

upper and lower links, having forward and rear ends, said rear ends being respectively associated with lateral ends of a wheel axle housing;

a bracket having front and rear portions respectively connected to a vehicle body via essentially vertical first shafts for horizontal rotational displacement thereabout, said bracket being associated with said forward ends of said upper and lower links via essentially horizontal second and third shafts for relative displacement thereabout, and said bracket being adapted for horizontal movement as said wheel axle bounds and rebounds, and vertical movement with respect to said first shafts for displacement relative to said vehicle body as rotational torque is applied to said wheel axle housing; and means, incorporated with said bracket for limiting vertical displacement of said bracket relative to said vehicle body to within a given range for suppressing vertical displacement of the vehicle body relative to said wheel axle housing.

12. A parallel link type automotive rear suspension comprising:

upper and lower links having forward and rear ends, said rear ends being respectively associated with two lateral ends of a rear wheel axle housing of the vehicle;

a bracket having front and rear portions respectively secured to a vehicle body via essentially vertical first shafts thereof for essentially horizontal movement thereabout and essentially vertical displacement relative to said vehicle body therealong, said bracket being associated with said forward ends of said upper and lower links via second and third shafts for permitting essentially vertical rotational movement thereabout;

means, incorporated with said bracket for restricting said vertical displacement of said bracket with respect to said vehicle body for absorbing energy for vertical displacement of said vehicle body relative to said wheel axle and thereby suppressing pitching movement thereof when the vehicle is in acceleration or deceleration.

13. The suspension as set forth in claim 10, 11, or 12, which further comprises first bushing assemblies, each said first bushing assembly having a first elastic bushing and being associated with one of said first shafts and second bushing assemblies, each said second bushing assembly having a second elastic bushing and being associated with one of said second and third shafts, each said first elastic bushing being more flexible than said second elastic bushing.

14. The suspension as set forth in claim 13, wherein said second bushings suppress vertical displacement of the vehicle body relative to said wheel axle.

15. The suspension as set forth in claim 14, wherein at least one of said second and third shafts is located at an elevation different from that of said first shafts.

16. The suspension as set forth in claim 15, wherein said second shaft with one of said second bushing assemblies is connected to said forward end of said upper link and is located at higher elevation than that of said first shaft with one of said first bushing assemblies at said rear portion of said bracket.

17. The suspension as set forth in claim 16, wherein said first shaft in said rear portion of said bracket is positioned at a higher elevation than that of said first shaft in said front portion of said bracket.

18. The suspension as set forth in claim 17, wherein said third shaft with one of said second bushing assemblies is positioned at the same elevation as that of said first shaft with one of said first bushing assemblies at said front portion of said bracket.

19. The suspension as set forth in claim 16, wherein said rear ends of said upper and lower links are connected to said lateral ends of said wheel axle housing via extensions vertically extending from said wheel axle housing, and said rear ends of said links pivot about third bushing assemblies each of which has an essentially horizontal shaft for allowing essentially vertical rotational movement of said links about said extensions and for vertical displacement thereabout.

20. The suspension as set forth in claim 13, wherein said means comprises a stopper member secured to each of said first shafts and mating surfaces of said first bushing assemblies adapted to contact, respectively, with said stopper members when said bracket vertically moves at said given amount relative to said vehicle body.

21. The suspension as set forth in claim 20, wherein each said stopper member comprises a collar with a laterally extending flange at the end thereof in one of said first bushing assemblies.

22. The suspension as set forth in claim 20, wherein each said stopper member comprises a collar of one of said first bushing assemblies having laterally extending flanges at both ends thereof.

23. The suspension as set forth in claim 18, wherein said means comprises stopper members, one said stopper member being associated with each of said first shafts with said first bushing assemblies, and a mating surface on each said second bushing assembly adapted to contact with one said stopper member when said bracket is vertically displaced relative to said vehicle body at said given amount.

24. A parallel link suspension for an automotive vehicle comprising:

upper and lower links having forward and rear ends, said read ends being associated with a wheel axle housing;

a bracket connecting respectively said forward ends of said upper and lower links to a vehicle body, said bracket having front and rear ends secured to said vehicle;

first vertical bushing assemblies with first vertical shafts associated, respectively, with said front and rear ends of said bracket and inserted between the vehicle body and said bracket, each said first bushing assembly including a first bushing elastically deformable for allowing lateral movement of said bracket relative to said vertical shafts, said first bushing assemblies being movable in an axial direction of said vertical shafts for allowing vertical movement of said bracket;

second horizontal bushing assemblies inserted between said forward ends of said upper and lower links and said bracket, said second bushing assemblies including second horizontal shafts about which said forward ends of said upper and lower links are rotatable in a vertical direction; and means, associated with said first bushing assemblies, for limiting vertical motion range of the latter within a predetermined range.

25. The suspension as set forth in claim 24, wherein said means comprises, for each said first bushing assembly, an inner collar in a hollow cylinder form to rotatably receive therein said first shaft and an outer tube surrounding said first bushing, said inner collar and said outer tube being provided laterally extending flanges which are spaced at a given distance with respect to each other at a neutral position of the suspension, said flanges being adapted to contact with each other according to relative displacement of said vehicle body and said bracket for limiting vertical displacement of said vehicle body relative to said wheel axle housing at said given distance.

26. The suspension as set forth in claim 25, wherein said second bushing is provided an elasticity adapted to absorb substantially short strokes of vibration energy applied from said wheel axle for suppressing road noise.

27. The suspension as set forth in claim 24, 25 or 26, wherein said first bushing assembly between front end of said bracket and said vehicle body is located at lower elevation and a laterally outer position relative to said first bushing assembly between said rear end of said bracket and said vehicle body.

28. The suspension as set forth in claim 27, wherein said upper and lower links are connected to said wheel axle housing via upper and lower brackets extending from said wheel axle housing and thus are located at different elevations at the forward ends thereof, said upper and lower links being connected to rear and front ends of said bracket via said second bushing assemblies at vertical and laterally different positions.

29. The suspension as set forth in claim 28, wherein the forward end of said upper link is connected to the rear end of said bracket at higher elevation and a laterally inner position relative to the front end of said lower link.

30. A suspension structure for an automotive vehicle comprising:

a wheel axle housing;

an upper link having two ends, one of said ends being pivotably connected to said wheel axle housing;

a lower link having two ends, one of said ends being pivotably connected to said wheel axle housing;

a bracket member connected to a vehicle body through a first bushing assembly having a first elastically deformable bushing and essentially vertical first pivot shafts, and to the other ends of said upper and lower links through a second elastically deformable bushing assembly having a second elastically deformable bushing and essentially horizontal shafts, said bracket member being movable in vertical and horizontal directions while the upper and lower links move in the same direction toward and away from the bracket, and causing pitching motion when said upper and lower links move in opposite directions with respect to the bracket; and means, associated with said bracket member, for limiting said pitching movement of said bracket member relative to said vertical pivot axis within a predetermined range, said means including stopper members, one said stopper member being associated with each of said first shafts of said first bushing assemblies, and a mating surface on each said first bushing assembly adapted to contact with one said stopper member when said bracket is vertically displaced relative to said vehicle body a given amount.

31. A suspension structure for an automotive vehicle comprising:

a wheel axle housing;

an upper link having two ends, one of said ends being pivotably connected to said wheel axle housing;

a lower link having two ends, one of said ends being pivotably connected to said wheel axle housing;

a bracket member connected to a vehicle body through a first bushing assembly having a first elastically deformable bushing and an essentially vertical first pivot axis, said bracket being movable in an axial direction of said vertical pivot axis and in a lateral direction with respect to said vertical pivot axis through elastic deformation of said first bushing in said first bushing assembly, said bracket member being connected to the other of said ends of said upper and lower links and allowing pivotal movement of said upper and lower links about essentially horizontal axes; and means, associated with said bracket member and responsive to rotational torque applied to said bracket through said upper and lower links when rotational torque is applied to said wheel axle housing, for limiting said axial movement of said bracket member relative to said vertical pivot axis within a predetermined range.

* * * * *